United States Patent
Burg et al.

(10) Patent No.: US 7,782,971 B2
(45) Date of Patent: Aug. 24, 2010

(54) METHOD AND DEVICE FOR DECODING A SIGNAL OF MULTIPLE INPUT/MULTIPLE OUTPUT SYSTEM

(75) Inventors: Andreas Burg, Maur (CH); Moritz Borgmann, Zürich (CH); Markus Wenk, Zürich (CH); Martin Zellweger, Weiningen (CH)

(73) Assignee: ETH Zurich, Zurich (CH)

( * ) Notice: Subject to any disclaimer, the term of this patent is extended or adjusted under 35 U.S.C. 154(b) by 238 days.

(21) Appl. No.: 11/662,854

(22) PCT Filed: Sep. 14, 2005

(86) PCT No.: PCT/CH2005/000544
§ 371 (c)(1),
(2), (4) Date: Oct. 2, 2008

(87) PCT Pub. No.: WO2006/029546
PCT Pub. Date: Mar. 23, 2006

(65) Prior Publication Data
US 2009/0063106 A1    Mar. 5, 2009

Related U.S. Application Data

(60) Provisional application No. 60/610,584, filed on Sep. 16, 2004.

(51) Int. Cl.
*H04B 7/02* (2006.01)
(52) U.S. Cl. .................................. 375/267
(58) Field of Classification Search ............. 375/260, 375/267
See application file for complete search history.

(56) References Cited

U.S. PATENT DOCUMENTS

| 3,922,540 | A | 11/1975 | Lunsford |
| 2004/0181419 | A1 | 9/2004 | Davies et al. |
| 2008/0267138 | A1* | 10/2008 | Walton et al. ............... 370/336 |
| 2008/0285670 | A1* | 11/2008 | Walton et al. ............... 375/260 |
| 2009/0190683 | A1* | 7/2009 | Awater et al. ............... 375/262 |

OTHER PUBLICATIONS

XP-002353941; Andreas Burg, Moritz Borgmann, Markus Wenk, Martin Zellweger and Wolfgang Fichtner; "VLSI Implementation of MIMO Detection Using the Sphere Decoding Algorithm"; pp. 1566-1577; IEEE Journal of Solid-State Circuits, vol. 40, No. 7, Jul. 7, 2005.

(Continued)

*Primary Examiner* — Don N Vo
(74) *Attorney, Agent, or Firm* — Cooper & Dunham LLP

(57) ABSTRACT

The method for decoding a received signal in a multiple input/multiple output system uses QR-decomposition of the linear channel matrix, but then applies a non-Euclidean norm during tree traversal. Two separate hardware units, namely an MCU and a MEU, art provided for concurrent operation. The MCU determines a next child node, while the MEU determines next best parent nodes on the previously processed tree levels, which makes it possible to retrace the path to a next starting node without investing dedicated processing steps (e.g., cycles). On each tree level, the possible coordinates are grouped into several circular sets in the complex plane, and a series of decision boundaries is calculated for each set that allows a quick evaluation of the optimum coordinate in each set.

28 Claims, 8 Drawing Sheets

OTHER PUBLICATIONS

A. Burg, M. Wenk, M. Zellweger, M. Wegmueller, N. Felber and W. Fichtner; "VLSI Implementation of the Sphere Decoding Algorithm"; pp. 303-306; © 2004.

XP-002353942; A. Burg, M. Borgmann, C. Simon, M. Wenk, M. Zellweger and W. Fichtner; "Performance Tradeoffs in the VLSI Implementation of the Sphere Decoding Algorithm"; pp. 93-97, 2004.

Paolo Gastaldo, Sandro Ridella and Rodolfo Zunino; "Vector Quantization Complexity and Quantum Computing"; pp. 3257-3262; © 2004.

XP-001224144; David Garrett, Linda Davis, Stephan ten Brink, Bertrand Hochwald and Geoff Knagge; "Silicon Complexity for Maximum Likelihood MIMO Detection Using Spherical Decoding"; pp. 1544-1552; IEEE Journal of Solid-State Circuits, vol. 39, No. 9, Sep. 2004.

XP-001163616; Bertrand M. Hochwald and Stephan ten Brink; "Achieving Near-Capacity on a Multiple-Antenna Channel"; pp. 389-399; IEE Transactions on Communications, vol. 51, No. 3, Mar. 2003.

XP-002368743; Kwan-wai Wong, Chi-ying Tsui, Roger Shu-kwan Cheng and Wai-ho Mow; A VLSI Architecture of K-Best Lattice Decoding Algorithm for MIMO Channels; pp. 273-276; © 2002 IEEE.

Zhan Guo, Peter Nilsson; VLSI Implementation Issues of Lattice Decoders for MIMO Systems; pp. 477-480; © 2004 IEEE.

XP-002178307; Emanuele Viterbo and Joseph Boutros; A Universal Lattice Code Decoder for Fading Channels; pp. 1639-1642; IEEE Transactions on Information Theory, vol. 45, No. 5, Jul. 1999.

XP-002353940; Erik Agrell, Thomas Eriksson, Alexander Vardy and Kenneth Zeger; "Closest Point Search in Lattices"; pp. 2201-2214; IEEE Transactions on Information Theory, vol. 48, No. 8, Aug. 2002.

* cited by examiner

METHOD AND DEVICE FOR DECODING A SIGNAL OF MULTIPLE INPUT/MULTIPLE OUTPUT SYSTEM

CROSS REFERENCES TO RELATED APPLICATIONS

This application claims the priority of U.S. patent application 60/610,584, filed 16 Sep. 2004, the disclosure of which is incorporated herein by reference in its entirety.

TECHNICAL FIELD

The invention relates to methods and devices for decoding a received signal in a multiple input/multiple output system having linear and noisy transmission characteristics.

BACKGROUND ART

Many problems in mobile communications can be described with a simple linear multiple-input multiple-output (MIMO) model. Examples include multiantenna systems or multiuser detection in CDMA. The transmission characteristics of such systems can usually be modeled, at least in approximation, by the equation $$y = Hs + n, \qquad (1)$$

wherein
y is an N×1 vector describing a received signal,
H is a channel matrix, wherein H=QR with an M×M upper triangular matrix R and an N×M unitary matrix Q,
s a transmitted M×1 signal vector whose coordinate values are chosen from a constellation O containing A possible coordinate values,
n is a N×1 vector of proper independently, identically distributed zero-mean complex Gaussian noise entries,
M is a number of transmitter sources, and
N is a number of receiver sinks.

The coordinates $s_i \in O$ of the symbols s are composed of values chosen from the complex constellation O. Real constellations can be considered as a special case. A typical solution of (1) for maximum likelihood (ML) detection involves the computation of $$\hat{s} = \operatorname*{argmin}_{s \in O} \|Rs - \hat{y}\|_2 \qquad (2)$$

with $\|\ \|_2$ denoting the Euclidean $l^2$-norm and with $\hat{y} = Q^H y$, and with $Q^H$ being the conjugate transpose of Q. Other mathematically equivalent methods may be used as well to arrive at an expression similar to (2).

In other words, the vectors s are transformed (via a unitary matrix Q) into a space where matrix R is triangular because, as described below, a triangular matrix R allows an efficient implementation of a recursive search algorithm. A transformation via a unitary matrix Q leaves the traditional $l^2$-norm of the trans-formed vectors unchanged, and therefore (2) is equivalent to a minimization of the Euclidean distance between Hs and y.

In fading MIMO channels, ML detection exploits Nth order diversity, which is not achieved by linear and successive cancellation receivers. Hence, ML detection is attractive in the high SNR regime. Unfortunately, the complexity of an exhaustive search implementation of (2) is exponential in the transmission rate. For the case where $O^M$ is a (real) integer lattice LM, sphere decoding (SD) has been proposed by Pohst [1] as an alternative approach, which has recently been introduced into communications. The algorithm achieves ML performance with an expected complexity that grows only polynomial in the rate [7]. Numerous optimizations have been proposed to reduce the implementation complexity of the original SD algorithm on general purpose processors and digital signal processors (DSPs) [3]. However, the VLSI implementation of the algorithm has only received limited attention so far.

DISCLOSURE OF THE INVENTION

Hence, it is a general object of the invention to provide algorithms and devices especially suited for efficient implementation.

Now, in order to implement these and still further objects of the invention, which will become more readily apparent as the description proceeds, a first aspect of the present invention relates to the method of claim 1.

In this aspect, an entry ŝ in O is determined for which $$\hat{s} = \operatorname*{argmin}_{s \in O} \|Rs - \hat{y}\|. \qquad (3)$$

In other words, the vectors s are (as in the conventional method described above) transformed (via unitary matrix Q) into a space where matrix R is triangular because, as described below, a triangular matrix R allows an efficient implementation of a recursive search algorithm. In contrast to known methods, though, a norm other than the (squared) $l^2$-norm is used. This is, at first sight, a crass contradiction to using a unitary transformation matrix Q (which preserves the $l^2$-norm but not other norms), but it has been found that the algorithm will still converge to reasonable values and provide decoding with low error rate. At the same time, using norms other than the $l^2$-norm, which is expensive to calculate, allows a more efficient implementation of the algorithm in silicon.

A particularly advantageous norm for application in the first aspect of the invention is the $l^\infty$-norm with $$\|(x_1, x_2, \ldots, x_M)\| = \max_i (|x_i|), \qquad (4)$$

since it is easily implemented in an electronic circuit. Corresponding definitions of the norm are defined for complex-valued $x_i$.

An other useful norm for application in the first aspect of the invention is the $l^1$-norm with $$\|(x_1, x_2, \ldots, x_M)\| = \sum_i |x_i|, \qquad (5)$$

which is, again, fairly easy to implement.

A second aspect of the present invention is described in claim 12. In this aspect, the method comprises at least one traversal of a tree. The leaves of the tree represent the possible signal vectors s.

The traversals are used for finding an entry ŝ in O for which $$\|Rs - \hat{y}\| < \hat{C} \qquad (6)$$

with $\|\ \|$ denoting a norm (any norm, including the $l^2$-norm), Ĉ a positive number and $\hat{y} = (\hat{y}_1, \ldots, \hat{y}_M) = Q^H y$, and with $Q^H$ being the conjugate transpose of Q. Each tree traversal comprises the recursive calculation of a partial distance $T_i$ from a partial distance $T_{i+1}$ along a path through the tree, wherein the partial distances $T_i$ are defined by $$T_i = \|e^{(i)}\| \qquad (7)$$

with $e^{(i)} = (0, \ldots, 0, e_i, \ldots e_M)$
and $e = (e_1, \ldots e_M) = Rs - \hat{y}$.

The traversal comprises the repeated execution of two steps a) and b) while descending along said path through levels i of said tree. The steps are step a) operating a first computing means for selecting a next child node in level i from a parent node in level i+1, and step b) operating a second computing means for selecting a next node in level j>i other than the parent node to be used in case that a next or future traversal has to start at level j.

By the, advantageously concurrent, execution of steps a) and b), it becomes possible to go back to a any higher level quickly, in case that the search ends at a dead end or a sphere constraint is applied, as described below. For an immediate return to any higher level, j=i+1 should be used.

A third aspect of the invention is again based on the traversal of a tree having leaves representing the possible signal vectors s and nodes in levels i=1 ... M. Each tree traversal comprises repeated steps of selecting a next node in level i given a node in level i+1 by finding the complex coordinate $s_i \epsilon O$ with a value $R_{ii}s_i$ that is closest to a complex value $b_i$ $$b_i = \hat{y}_i - \sum_{j=i+1}^{M} R_{ij}s_j, \quad (8)$$

again with $\hat{y}=(\hat{y}_1, \ldots, \hat{y}_M)=Q^H y$

As e.g. known from [11] for circular sets, the possible coordinates $s_i$ are divided into sets $C^k$, each set $C^k$ having mk members with coordinates $s_i=s^{k,1}, \ldots, s^{k,mk-1}$, or $s^{k,mk}$, all of which have a common absolute value $V^k=|R_{ii}s^{k,1}|=\ldots=|R_{ii}s^{k,mk}|$. In at least some of the said repeated steps the coordinate $s_i$ is selected by step i) prior to the traversal, determining, for at least some of the pairs of neighboring members $s^{k,j}$, $s^{k,j+1}$ of each set $C^k$, a first boundary $B^{k,j}$ given by a line of all numbers of equal distance from $R_{ii}s^{k,j}$, $R_{ii}s^{k,j+1}$, and step ii) during said traversal, selecting the coordinate $s_i$ by comparing, for at least one of said sets $C^k$, said value $b_i$ to said first boundaries $B^{k,j}$, thereby determining the member of set $C^k$ whose value $R_{ii}s^{k,j}$ is closest to the value $b_i$.

Steps i) and ii) are in contrast to [11]. In particular, step i) can be calculated prior to the traversal, which makes the traversal faster.

This scheme is suited to avoid the evaluation of hyperbolic functions and quadratic equations by storing, for each first boundary $B^{k,j}$ the ratio between the real and imaginary parts of the numbers lying on the boundary. This stored (precomputed) ratio can later be accessed and easily compared to the corresponding ratio of $b_i$ during the traversals. The comparison may advantageously be performed by expanding the corresponding inequality with the denominators of both sides so that checking can be performed without divisions.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

1. Definitions

Figure 1:
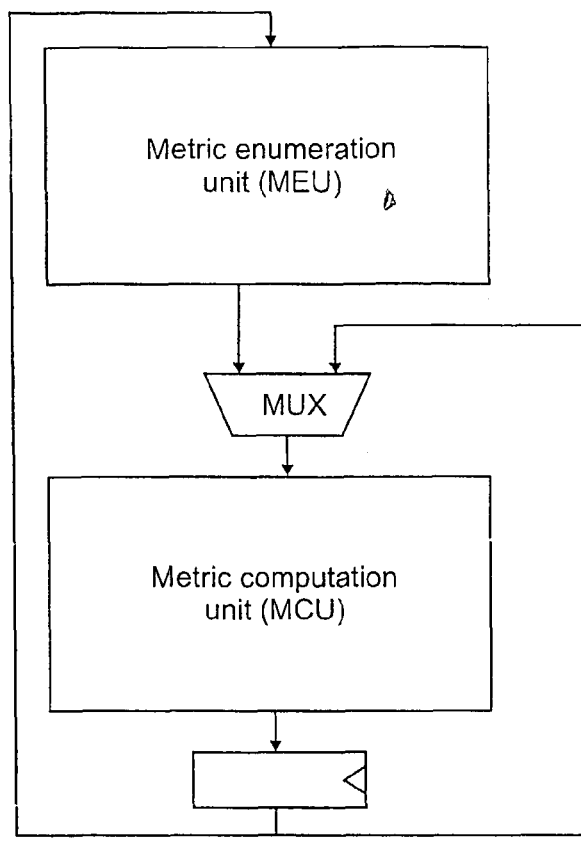
FIG. 1 is an overview over a device for recursive tree traversal.

Operators: The following operator notation is used:
  the operator $\| \, \|$ denotes, unless stated differently, a norm attributing a scalar length to a vector. This may be a norm or semi-norm in the strict mathematical sense or an approximation of a norm or semi-norm in the strict mathematical sense.

Similarly, the operator $|\;|$ applied to a complex number defines any norm (or an approximation thereof) of a complex number. In particular, one of the following definitions may be used
  $|a+ib|=\sqrt{a^2+b^2}$,
  $|a+ib|=\max(|a|,|b|)$, or
  $|a+ib|=|a|+|b|$
  with a and b being the real and imaginary parts of a complex number.

The operator $\| \, \|_n$ used to express an $l^n$-norm.
  $\epsilon\{\cdot\}$ stands for the expectation operator.
  ~ is the binary "not" operator.

Tree traversal: As known to a person skilled in the art, the type of coding schemes described herein can be expressed in terms of traversals through a tree. Such a tree has leaves representing the possible symbols s and nodes arranged in levels i= 1 ... M, each node representing one possible selection of coordinates $s_i \ldots s_M$ from the set of possible coordinates. A traversal is a path descending from node to node through some or all the levels i.

2. State of the Art in Sphere Decoding

Under the term sphere decoding we subsume the original SD algorithm and all the variations and extensions proposed later [8, 10, 2]. The algorithm consists of four key concepts that need to be clearly differentiated:

2.1 Sphere Constraint

The main idea is to reduce the number of points that need to be considered in the search for the ML solution. The list of candidates is constrained to only those points Hs that lie inside a sphere with a given radius C around the received point y:

$$d(s) \leq C^2 \text{ with } d(s) \underline{\Delta} \|Hs-y\|^2. \quad (9)$$

We refer to equation (9) as the sphere constraint (SC).

2.2 Tree Pruning

Efficient checking of the SC only becomes feasible after unitary transformation that converts matrix H into a triangular matrix R as in equation (2). Assuming that $N \geq M$, this goal can, for example, be achieved using the QR decomposition of the channel $H=QR$ with the $M \times M$ upper triangular matrix R and the $N \times M$ unitary matrix Q. In this case, the SC (9) becomes $$\hat{d}(s) \leq \hat{C}^2 \text{ with } \hat{d}(s) \triangleq \|Rs - \hat{y}\|^2 \qquad (9)$$

where the M-dimensional $\hat{y}=(\hat{y}_1, \ldots \hat{y}_M)=Q^H y$, and where in the case $N>M$ the radius C needs to be adjusted to yield the modified radius C. As a result of the triangular structure of R, the distance $\hat{d}(s)$ can now be computed, in the $l^2$-norm, recursively as follows:

$$T_i(s) \leftarrow T_{i+1}(s) + \left(\hat{y}_i - \sum_{j=i+1}^{M} R_{ij} s_j - R_{ii} s_i\right)^2 \qquad (11)$$

with $T_{M+1}(s)=0$ for all $s \in O$. Finally, $d(s)=T_1(s)$. We term $T_i(s)$ the partial distance (PD) of a symbol s at level i.

Hence, $T_i$ corresponds to $$T_i = \|e^{(i)}\| \qquad (11a)$$

with vector $e^{(i)}=(0, \ldots, e_i, \ldots e_M)$ being the "tail end" of a vector e defined by $e=(e_1, \ldots e_M)=Rs-\hat{y}$. The operator $\|\ \|$ denotes the used norm ($\|\ \|_2$ in the example of Eq. 11).

All possible symbols $s \in O$ can now be considered by tree traversal with the root at $i=M+1$. Since the PD increases monotonically from level to level, a branch together with all its children can be pruned whenever its PD exceeds $\hat{C}^2$. The remaining branches belong to an admissible set of constellation points that need to be followed further. Ideally this set should constitute only a small subset of the constellation O. The goal of the SD algorithm is to prune large parts of the tree, such that the complexity of the search for the ML solution is greatly reduced.

One of the main issues with the original Pohst algorithm is the choice of the sphere radius $\hat{C}$. If chosen too small, no solution is found—however, too many nodes need to be considered for a radius chosen too large. If we set $\hat{C}=\hat{d}(s)$ whenever an admissible point s is found [2], the sphere radius decreases throughout the algorithm, and as a result fewer points need to be considered. This radius updating can be performed in a smart fashion, such that a restart of the algorithm with each radius update can be avoided [3].

2.3 Admissible Intervals

When the underlying constellation O is real, e.g., if it constitutes a real lattice, we can easily verify that at a given level i, any constellation point $s_i$ that lies between two admissible points is also admissible. As a consequence, the admissible set is actually an interval. Checking whether $s_i$ is in the admissible set therefore only amounts to comparing $s_i$ to the boundaries of that interval.

The latter point often leads to the impression that sphere decoding concepts are only applicable to real lattices. However, it is crucial to realize that only the first two ideas described above are actually prerequisites for the tremendous complexity savings of the SD algorithm over a brute force search. In fact, sphere decoding is applicable to arbitrary sets of constellation points, in particular to complex lattices [14, 15]. In this case, the PD computation becomes $$T_i(s) \leftarrow T_{i+1}(s) + \left|\hat{y}_i - \sum_{j=i}^{M} R_{ij} s_j\right|^2, \qquad (12)$$

but membership in the admissible set cannot simply be determined using the bounds of an admissible interval. We shall explore solutions to this problem in Section 4.

2.4 Schnorr-Euchner Enumeration

Without radius updating, the order in which nodes are visited is irrelevant for the pruning of the tree. However, radius updating leads to the greatest complexity reduction if symbols with smaller distance are visited first. Also, in order to find admissible symbols as fast as possible depth-first traversal of the tree is mandatory. With the Schnorr-Euchner (SE) enumeration [10], on each level nodes with the smallest PD are followed first, leading to a more rapid shrinkage of the sphere radius. Hence the tree is pruned more efficiently. As an additional advantage of the SE enumeration, the initial sphere radius can be set to infinity. In that case, the first admissible point found is always the so called zero-forcing decision-feedback point.

Summarizing, combined radius updating with SE enumeration is highly recommended, whenever applicable. We shall investigate how to perform the enumeration in practical implementations in Section 4.

3 Considerations for VLSI Implementation

Dedicated VLSI architectures differ from implementations on DSPs through their potential for massively parallel processing and the availability of customized operations and operation sequences that can be executed in a single cycle. The potential of an algorithm to exploit these properties is crucial to guarantee an efficient high throughput implementation.

3.1 General Architecture

The VLSI architecture of a high-throughput SD application specific integrated circuit (ASIC) should be designed to ensure that the decoder examines the branches (i.e., children) of a new node in each cycle (or step) and that no node in the tree is ever visited twice. This paradigm guarantees maximum throughput efficiency. It is achieved by partitioning the decoder into two parallel units:

1. The metric computation unit (MCU, called "first computing means" in the claims) starts from $T_{i+1}(s)$ (i.e., the metric of the current node, the "parent node" in level i+1 of the tree) and finds the starting point ("child node") in level i of the tree) for the SE enumeration along with the PD $T_i(s)$ of the corresponding branch. When the bottom of the tree is reached, the MCU stores the symbol corresponding to the current path and updates the radius. In this case, or if the admissible set is empty, a new node branching off the current path further up in the tree is visited next. If no more valid branches (i.e., children) are found, the decoder stops.

2. The metric enumeration unit (MEU, called "second computing means" in the claims) operates solely on nodes that have already been visited by the MCU. It carries out the SE enumeration to find the branch with the smallest PD among those that have not been visited yet. It keeps a list of these admissible children for all nodes on the current path. When the MCU reaches a leaf or a dead end, the MEU can decide immediately where (i.e., at which level and which node) the search should be continued in the next cycle. Tree traversal is performed depth-first. The MEU advantageously stores at least one PD $T_{i+1}$ for each traversed level.

A corresponding device with an MCU and MEU, as well as additional components to be described below, is shown in FIG. 1. The multiplexer MUX either feeds the selected child node back to the MCU or a node that has been selected by the MEU among those that have not been visited yet.

Figure 2:
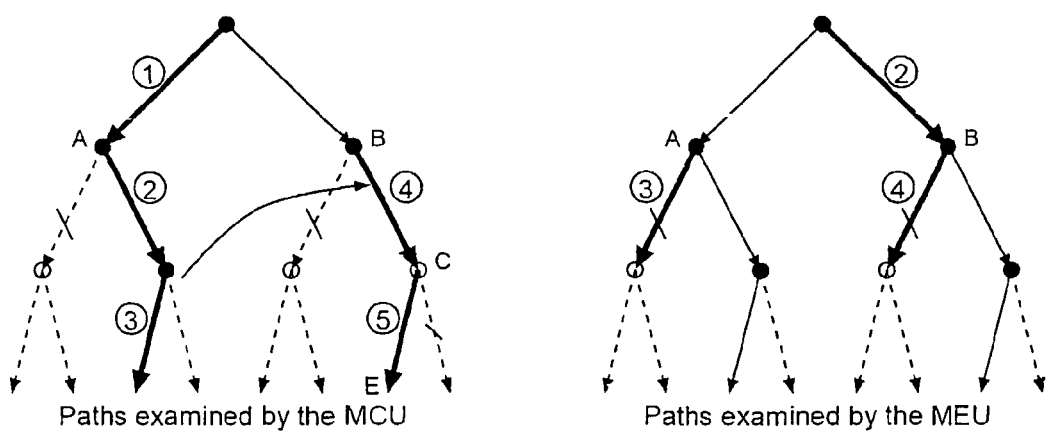
FIG. 2 is a tree traversal example with M=3 and BPSK; the order and cycle number in which the MCU and MEU examine the branches is shown.

The described procedure is exemplified in FIG. 2 for $M=3$ and BPSK modulation. On the left, the branches that are examined by the MCU on the way down are marked. The MEU follows along the same nodes with one cycle delay and computes the PD of the branch that would follow next in the SE enumeration. After cycle 3, the MCU has found the first complete candidate symbol. In the meantime, the MEU has determined that only the branch to node B still meets the updated SC and has already computed its PD. Therefore, the MCU can proceed immediately to check the branch leading to node C in cycle 4 and finally to the leaf E.

Note that no extra steps or cycles are wasted to slowly climb up the tree step-by-step.

Hence, the MCU and MEU carry out separate steps: (step a) the MCU determines the starting child node in level i from the parent node in level i+1 while (step b) the MEU determines the next node in level i+1 other than the parent node, which next node is to be used in case that a next traversal has to start at level i+1. As can be seen From FIG. 2 and the above, the MCU and MEU can advantageously run the steps a) and b) concurrently, e.g. in the same clock cycle.

In step a), the MCU advantageously determines the partial distance $T_i$ for the next child node from the partial distance $T_{i+1}$, e.g. using Eqs. 16 and 17, or 18, 21b or 21c below. In step b), the MEU advantageously determines $T_{i+1}$ of the next parent node in level i+1 of the tree.

In the example above, the MEU works on selecting a next node in level i+1 (step b) while the MCU works on selecting a next node in level i (step a). In principle, there can be a larger lag between the MEU and the MCU, i.e. the MCU can work in any level j>i in step b while the MCU works on level i in step a. A lag of a single level is advantageous because it allows the device to return to any of the pre-ceding levels without time loss.

3.2 Complexity and Performance Metric

For the architecture described above, we introduce suitable metrics that characterize throughput and implementation complexity:

Performance: The recursive tree-pruning scheme applied in the SD algorithm suggests that the described processing of a single node in one step (e.g., in one cycle) is the maximum degree of parallelism that can be achieved while fully preserving its complexity advantage over an exhaustive search. Processing multiple sub-sequent nodes in parallel would instead gradually lead back to the implementation of an exhaustive search decoder. Although this approach opens up further tradeoffs between chip area and throughput, we do not pursue it here. In a one node per cycle architecture, the overall performance of the decoder is governed by two criteria:

1. the average number of visited nodes $\epsilon\{K\}$ before the ML solution is found, which determines the number of cycles per symbol
2. the cycle time $t_{CLK}$, which is given by the critical path through the longest chain of consecutive operations in one cycle.

The first criterion characterizes the efficiency of the tree pruning and can be considered purely on an algorithmic level. The second criterion is concerned with the efficiency of the hardware implementation. The overall throughput is given by $\Phi = M \cdot \log_2 |O|/(\epsilon\{K\} t_{CLK})$. Note that, as opposed to optimizations that target DSPs, the pure number of operations (FLOPs) is of little significance.

Circuit Complexity: The circuit complexity is measured by the area required for the integration of all processing elements and the memory. Just as the delay it varies significantly depending on the type of operation and on the associated word-width.

4. Schnorr-Euchner Enumeration in Arbitrary Sets and Complex Lattice

The most critical part in the design of a SD is finding the admissible set, and the implementation of the SE enumeration. In the complex case, there is no admissible interval. Three approaches to identify the admissible set have been proposed:

Real Decomposition: In the case of rectangular (complex) Q-QAM constellations, a common procedure is to decompose the M-dimensional complex problem into an equivalent real-valued problem according to $$\begin{bmatrix} \Re\{y\} \\ \Im\{y\} \end{bmatrix} = \begin{bmatrix} \Re\{H\} & -\Im\{H\} \\ \Im\{H\} & \Re\{H\} \end{bmatrix} \begin{bmatrix} \Re\{s\} \\ \Im\{s\} \end{bmatrix} + \begin{bmatrix} \Re\{n\} \\ \Im\{n\} \end{bmatrix} \quad (13)$$

The result is a real lattice $L^{2M}$ of dimension 2M with $\sqrt{Q}$ constellation points per dimension. The decoder can now explicitly compute the center point of an admissible interval, from which it proceeds with the enumeration in a zig-zag fashion [10] until a constellation point is outside the admissible interval. This condition can be checked based on explicit computation of the boundaries or by simply checking the SC [3].

However, traversing the resulting, deeper tree with fewer branches per node reduces the potential for parallel processing compared to a more shallow tree with more branches per node. Since the number of visited nodes is an important performance metric in the case of VLSI implementations, the decomposition of the complex into a real lattice entails a significant performance degradation. Moreover, on a circuit level, no advantage can be taken from the orthogonality of the real and complex part and the symmetries in the complex constellations. Additionally, the computation of the center point of the admissible interval for SE enumeration is slow. Consequently, decomposition into a real lattice is not advisable for a high-throughput VLSI implementation.

Exhaustive Search: To directly determine the admissible set, an exhaustive search over the full constellation O can be performed. Explicit sorting of the PDs is subsequently used to realize the SE enumeration. As opposed to the first solution, this method allows for arbitrary complex constellations and does not increase the depth of the search tree. At first sight, the full search appears to have a very high implementation complexity as the PDs need to be computed for all candidate constellations. However, (12) can easily be decomposed into $$T_i(s) = T_{i+1}(s) + |b_i(s)|^2 - 2\Re\{b_i^*(s)R_{ii}s_i\} + |R_{ii}|^2 s_i^* s_i \quad (14)$$

with $$b_i = \hat{y}_i - \sum_{j=i+1}^{M} R_{ij} s_j \quad (15)$$

As a result, most of the costly operations can be shared among all candidate points by reusing the value of $b_i$ that does not depend on the value of $s_i$. The drawback of this approach is that the PDs of all children of the nodes on the path down need to be stored to perform the enumeration. Additionally, the decision for the smallest metric in the MCU involves a search over all constellations, which is slow and leads to a long cycle time.

Hybrid Schemes: Depending on the constellation, hybrid approaches between exhaustive search and ordered enumeration may also be possible, as proposed in [11]: Starting from PSK modulation, admissible intervals are defined based on the phase of the constellation points. Subsequently, QAM modulation is described as the union of PSK subsets, within which enumeration is straightforward. SE ordering across subsets is achieved through explicit sorting of the PDs.

The difficulty in the application of this approach is the computation of the starting points for the PSK enumerations. However, with a specific modulation scheme in mind it can be performed by simple direct comparisons between the real and imaginary parts, and no angles need to be computed, as opposed to [11]. As a result, this approach generally yields the lowest circuit complexity for QAM modulation and requires only a few PDs to be stored and compared.

5. The Square Root Sphere Criterion 5.1 Alternatives

The computation of the PD on each level can be decomposed into the computation of an error term $e_i(s)$ and the recursive update of the PD:

$$e_i(s) \leftarrow \hat{y}_i - \sum_{j=i}^{M} R_{ij} s_j \quad (16)$$

$$T_i(s) \leftarrow T_{i+1}(s) + |e_i(s)|^2. \quad (17)$$

The squaring operation in (17) consumes a large chip area and is slow, limiting the performance of the PD computation. Moreover, controlling the dynamic range of the numbers becomes a more severe issue after squaring. In order to eliminate the square, we have proposed to operate on the square root $\tilde{T}_i = \sqrt{T_i(s)}$ of the PDs, which yields an equivalent detector. By taking the square root of (17), we obtain $$\tilde{T}_i(s) \leftarrow \sqrt{\tilde{T}_{i+1}(s)^2 + |e_i(s)|^2}. \quad (18)$$

For this type of expression, numerous approximations of the form $\sqrt{x^2+y^2} \approx f(|x|,|y|)$ are available. Four approximations with efficient VLSI implementations are:

| | |
|---|---|
| $l^1$-norm | $\|x\| + \|y\|$ |
| $l^\infty$-norm | $\max(\|x\|, \|y\|)$ |
| hybrid 1 | $\frac{3}{8}(\|x\| + \|y\|) + \frac{5}{8}\max(\|x\|, \|y\|)$ |
| hybrid 2 | $\max(\max(\|x\|, \|y\|), \frac{7}{8}\max(\|x\|, \|y\|) + \frac{1}{2}\min(\|x\|, \|y\|))$ |

They all lead to new (suboptimal) detectors, which can be interpreted as minimizing another norm for the triangularized problem (instead of the Euclidean or $l^2$-norm, which corresponds to the ML solution). In particular, the first approximation leads to the minimization of the $l^1$-norm of $Rs-\hat{y}$ $$\hat{s} = \mathrm{argmin}_{s \in O^M} \sum_{i=1}^{M} |e_i(s)| = \mathrm{argmin}_{s \in O^M} \|R_s - y\|_1. \quad (19)$$

The second approximation leads to a minimax optimization, or the minimization of the $l^\infty$-norm:

$$\hat{s} = \mathrm{argmin}_{s \in O^M} \max_{i \in \{1,2 \ldots M\}} |e_i(s)| = \mathrm{argmin}_{s \in O^M} \|Rs - \hat{y}\|_\infty. \quad (20)$$

The remaining approximations correspond to hybrid norms. Note that only the $l^2$-norm exhibits the property that the minimization on the original and the triangularized problem yield the same solution.

In the complex case, the same approximations can be used to compute the absolute value of the complex error term $|e_i(s)|$ from its real and imaginary part. The reduction in circuit complexity is significant. Still, the impact on bit error rate (BER) is small.

Figure 3:
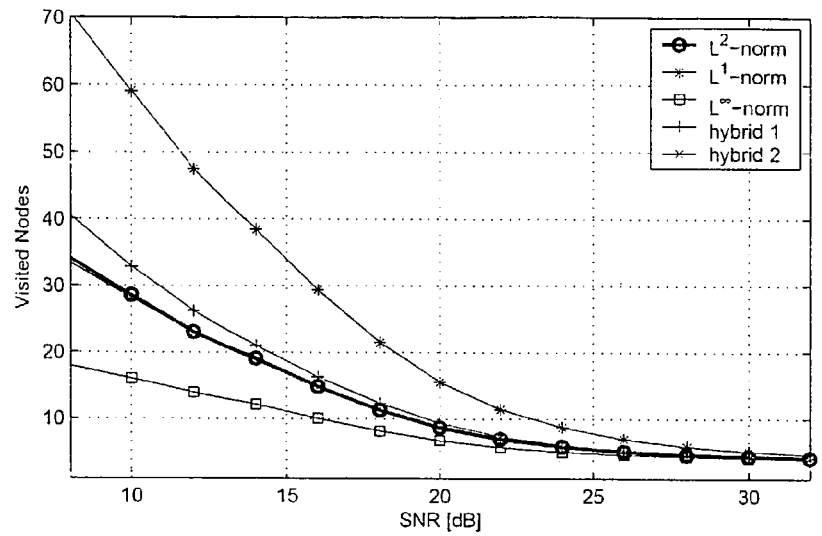
FIG. 3 is the umber of visited nodes vs. SNR for the square root sphere detector with different approximations (modulation: 16-QAM, N=M=4)

Impact on Complexity:

Since $$\|Rs-\hat{y}\|_\infty \leq \|Rs-y\|_2 \|Rs-y\|_1 \quad (21)$$

the accumulated distance at the bottom of the tree is smallest for the $l^\infty$-norm. After the radius update, it is therefore more probable that the PD for a certain node further up in the tree is larger than the new radius, as compared to the $l^2$-norm case. Therefore, more branches in the tree will be pruned. The situation is just the opposite for the $l^1$-norm, therefore tree pruning becomes less effective. The impact on complexity is clearly visible in FIG. 3. It is remarkable that employing the $l^\infty$-norm almost halves the complexity at low SNR.

Figure 4:
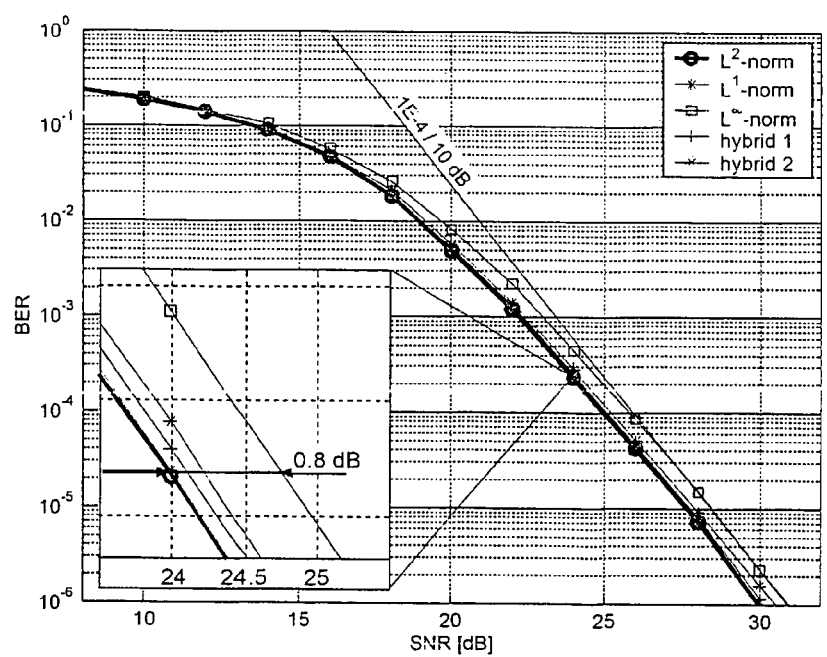
FIG. 4 shows BER vs. SNR for the square root sphere detector with different approximations (modulation: 16-QAM, N=M=4)

Impact on Bit Error Rate: The approximations of the $l^2$-norm warp the sphere that is searched when looking for the ML solution. However, we can show analytically that full diversity is preserved regardless of the particular norm employed. This fact can also be verified experimentally as shown in FIG. 4. Among the approximations considered, the $l^\infty$-norm detector shows the most pronounced constant loss in BER, although the degradation may well be acceptable in many cases.

5.2 Conclusions

Concluding, the $l^\infty$-norm approximation represents a very attractive approach as it leads to greatly reduced search complexity as well as reduced chip area (in the case of a VLSI implementation) at only a minor BER penalty.

However, as seen from the above discussions, other norms than the $l^\infty$ can be used as well, such as the $l^1$-norm or approximate norms such as the approximations hybrid 1 and hybrid 2 shown in the table above. This freedom to choose a norm other than $l^2$ allows to optimize the design in view of speed or chip size.

Using the $l^\infty$-norm, i.e. $\|(x_1, x_2, \ldots, x_M)\| = \max(|x_i|)$, Eq. 17 is replaced by $$T_i(s) = \max\left(T_{i+1}(s), \left|\hat{y}_i - \sum_{j=i}^{M} R_{ij} s_j\right|\right) \quad (21a)$$

Using the $l^1$-norm, i.e.$\|(x_1, x_2, \ldots, x_M)\| = \sum_i |x_i|$, Eq. 17 is replaced by $$T_i(s) = |T_{i+1}(s)| + \left|\hat{y}_i - \sum_{j=i}^{M} R_{ij} s_j\right| \quad (21b)$$

As it is clear to the person skilled in the art after review of the above, when an arbitrary norm is used in a sphere decoding algorithm, Eq. 10 has to be replaced by $$\|Rs-\hat{y}\| < \hat{C} \quad (21c)$$

$\|\ \|$ with denoting the norm to be applied. Each tree traversal will then have the aim to find a vector s that fulfils the condition of Eq. 21c. Each traversal comprises the recursive calculation of $T_i$ from $T_{i+1}$ (according to the used norm, e.g. by applying Eqs. 21a or 21b) along the path.

For all discussed norms, the calculation of the partial distance $T_i$ of the child node from the partial distance $T_{i+1}$ of the parent node requires the evaluation of the term $$e_i = \hat{y}_i - \sum_{j=i}^{M} R_{ij} s_j \tag{21d}$$

which can be computed by evaluating $$e_i = b_{i+1} - R_{ii} s_i, \tag{21e}$$

with $b_i$ as defined in Eq. 15. Since the value of $b_{i+1}$ does not depend on the child node, it can be used for the calculation of the PD of several child nodes of the same parent node. It can e.g. be stored for subsequent calculations of the value of $e_i$, e.g. in cases where a search algorithm requires the time delayed computation of the PD of several child nodes of the same parent node. Advantageously, the values of $b_{i+1}$ are stored in the MEU, in a cache sufficiently large to hold the value of $b_{i+1}$ for each traversed node on the current path.

Subsequent traversals will be carried out, with decreasing values of $\hat{C}$, as mentioned in section 2.2 above. Advantageously, the value of $\hat{C}$ is decreased until a single entry s in O fulfils $\|Rs-y\|<\hat{C}$.

6. ASIC Implementation Results

As a proof of concept, a SD ASIC for a 4×4 system with 16-QAM modulation has been realized in a 0.25 µm technology. It is based on a direct implementation of complex SE enumeration using a decomposition into three nested PSK constellations. For the metric computation, the square root sphere algorithm is used in conjunction with the $l^\infty$-norm. The critical path starts with the computation of $b_{i+1}(s)$, followed by the part of the MCU that finds the starting point for the PSK enumeration, and the metric computation. It then continues with the selection of the minimum and into the MEU, adding up to a total delay of 13.5 ns, allowing for a clock of 75 MHz. The active core area of the chip covers only 1 mm2.

Figure 5:
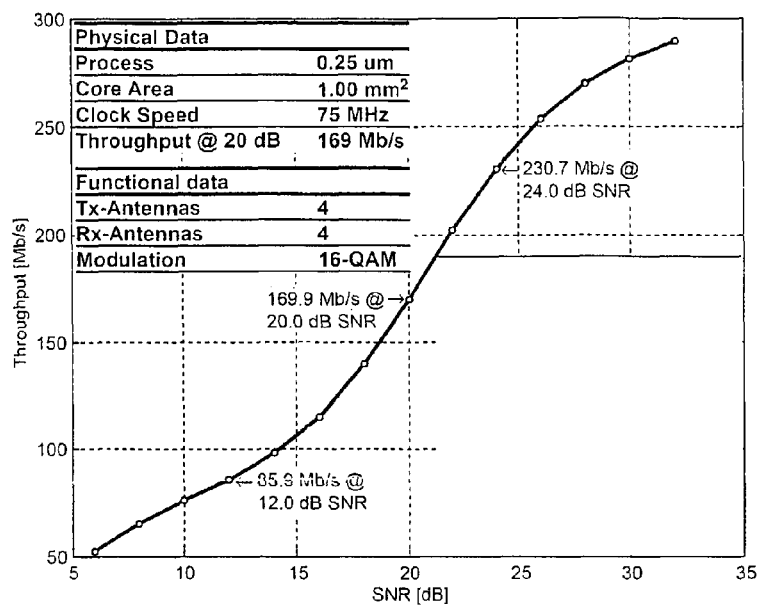
FIG. 5 is a summary of technical data of the sphere decoder ASIC.

Compared to a previously presented implementation, it only requires a third of the area and achieves a 50% higher clock rate. Also, fewer iterations are required for the decoding due to the complexity reduction by the $l^\infty$-norm approximation and other minor optimizations. The result is a more than doubled throughput at SNR=20 dB. The technical specifications and the throughput of the ASIC at different SNRs are given in FIG. 5.

7 Specific Implementations

Figure 6:
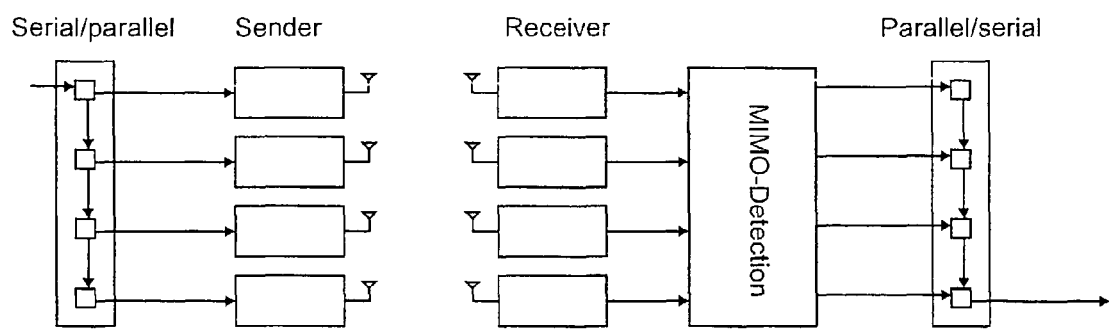
FIG. 6 is a diagram of a transmission system using a device according to the present invention.

FIG. 6 shows an overview of one possible embodiment of a trans-mission system using the present invention. The transmitter splits an incoming highrate data stream into parallel lower-rate streams. The data streams may undergo further encoding and are then sent over the transmission medium. The data streams are received by receivers and fed to the MIMO detector. The data steams from the MIMO detector will then be serialized to form a high-rate data stream. The following sections describe two possible embodiments of the MIMO detector.

7.1 First embodiment 7.1.1 Overview

Figure 7:
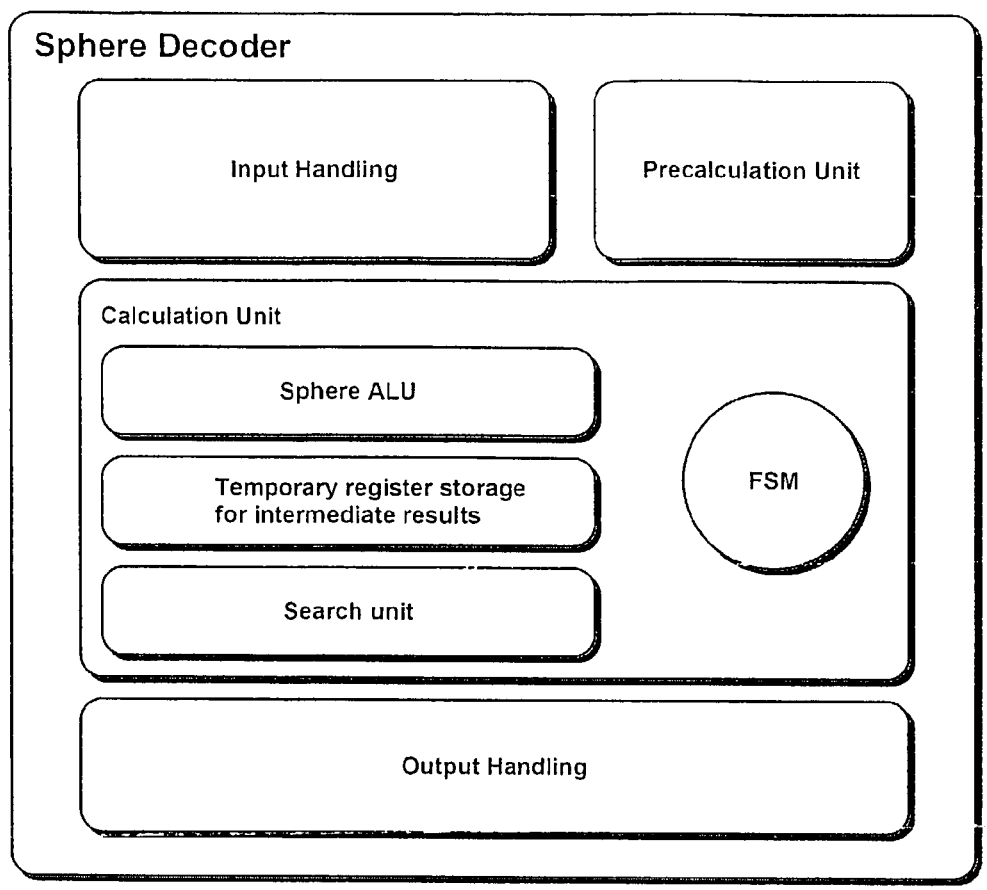
FIG. 7 is block diagram of a first embodiment of a decoder.

FIG. 7 is an overall block diagram of a first embodiment of a sphere decoder. It consists of several parts which will be explained in detail in this chapter. The major blocks in FIG. 7 are:

Input Handling: reads the inputs, stores them until they are needed and provides the right values to the Calculation Unit Precalculation Unit: this unit does the calculation of the Euclidean distance, searches the nearest constellation point and provides it to the Calculation Unit.

Calculation Unit: controls the algorithm (FSM), provides the Sphere ALU and the Search Unit with the accurate data and has a temporary register storage for the intermediate results Sphere ALU: calculates $T_i$ from $T_{i+1}$ Search Unit: searches the next best constellation point Output Handling: provides the result in a manner that they can be read from outside the chip 7.1.2 Sphere ALU The Sphere ALU can e.g. calculate expressions of the type of (14) or (21a, b). It can also compute the comparison of (21c). A further speed up in the ALU can be achieved by subtracting the new values from the actual radius instead of adding and comparing them.

7.1.3 Calculation Unit

Figure 8:
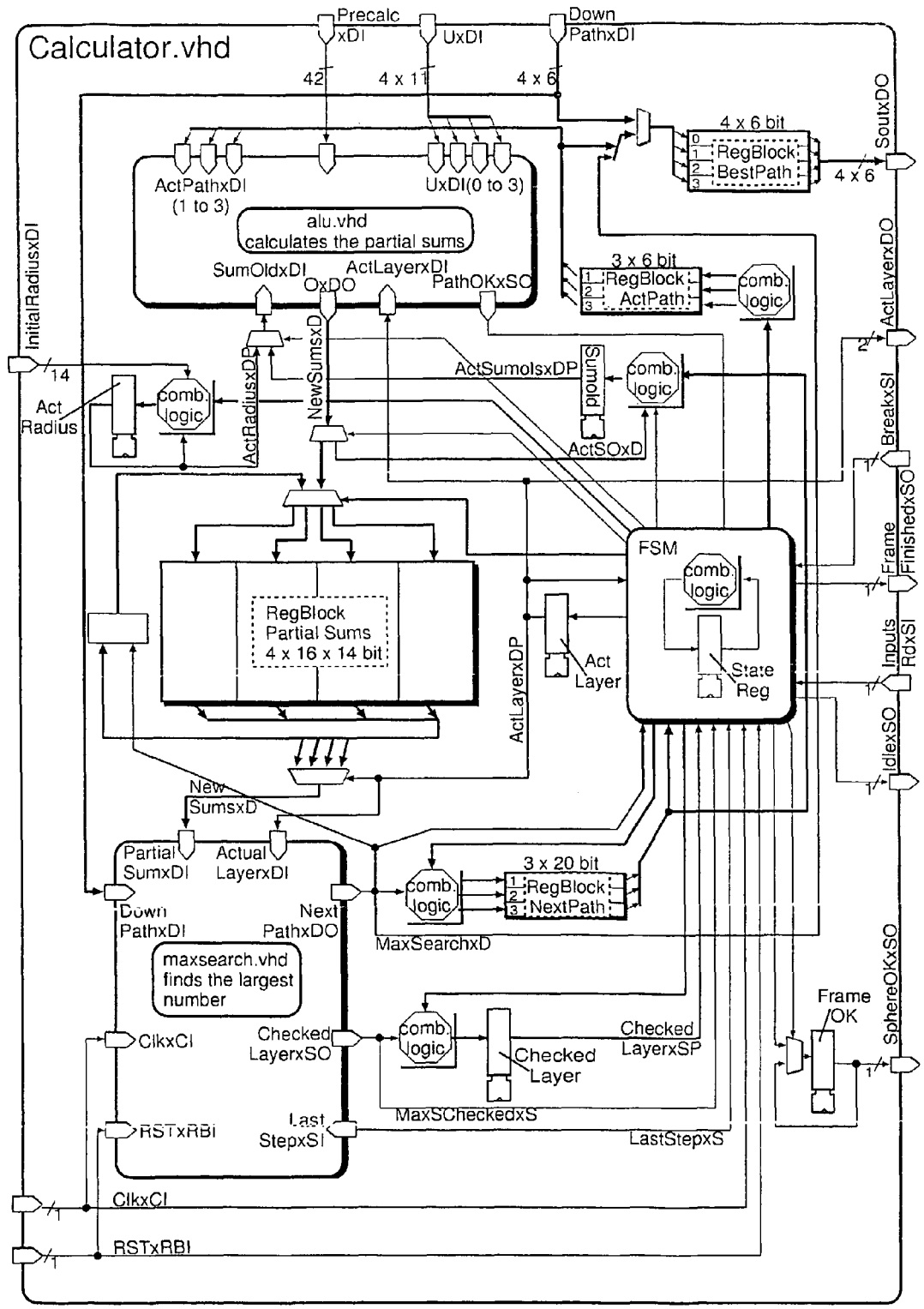
FIG. 8 shows the calculation unit of the first embodiment of the decoder.

The fundamental task of the Calculation Unit is to feed the ALU with the right inputs at the right time and keep an account of all paths already passed and all paths going to be passed (tree search!). It also controls the algorithm flow. This is why the FSM of this entity plays an important role. While the actual layer is being evaluated, the search unit is fed with the old output values of the ALU, thus calculating the next path for the layer above. If the bottom layer is reached, an extra clock cycle is invested in this embodiment to find the largest ALU output. An overview of the Calculator can be found in the block diagram of FIG. 8.

Several registers are needed. The most important is the main register block (RegBlock), where all partial sums of the nodes deviating from and including the present path (here: four layers) are stored. Because all sixteen constellation points in the same branch are calculated at the same time and only one of them is needed immediately, it is necessary to store the intermediate sums for a later use. There are 4×16 registers needed, each one having a width of 14 bit. Then there is one regisister block for the current path(ActPath), another one for the path going to be passed if the actual path is exhausted (NextPath), and a third one for the MIMO-symbol found as solution so far (BestPath). Other required registers are:

ActRadius: Stores the actual sphere radius

Sumold: Stores the intermediate sum of the path where the algorithm will go down next. This sum is then fed back into the ALU (ActSumoldxD), if the actual layer is not the top layer.

ActLayer: Stores the actual layer

CheckedLayer: Stores for each layer, if there is still a constellation point within the sphere or not.

All these registers make it possible to directly jump to the branch that is to be calculated next.

The calculator starts as soon as it gets the signal ReadytorunxS='1' and the previous MIMO-symbol is finished. The required registers are initialized (ActPath='0', ActRadius=initial sphere radius, SphereOK='0'), the next layer is set to TxAntennas='4' and the next state to 'toplayer'. There, the BestPath is set to the DownPath (in this particular implementation approximated by the ZF solution) and Act-SumoldxD for the ALU is the initial sphere radius. The algorithm then proceeds to the intermediate layers (layers 3 down to 1 in case of 4 transmit antennas), where it goes down as long as PathOKxS is '1'. Meanwhile the RegBlock, Next-Path, ActPath, Sumold and CheckedLayer registers are updated continually.

If PathOKxS is '0', the CheckedLayer register is consulted to find the next upper or parallel layer which hasn't been checked fully. The corresponding NextPath is written into the ActPath and the corresponding intermediate sum (also stored together with NextPath) gets the Sumold. If PathOKxS is '1' in the bottom layer, then the last step will be reached. In this state the ALU outputs are not needed, only the search unit is important. It has to search the maximum. In case it returns a sum greater than zero (MaxSearchCheckedxS='0'), a new sphere radius has been found and the registers RegBlock, NextPath and CheckedLayer have to be updated and SphereOKxS is set to '1'. Then the next state and layer is searched as described for the intermediate layers.

Whenever PathOKxS is '0' and all layers checked, the MIMO-symbol is found. In case ReadytorunxSI is already '1', the required registers are initialized as if coming from idle, toplayer will be the next state. If ReadytorunxSI is '0', the calculator will go idle.

Figure 9:
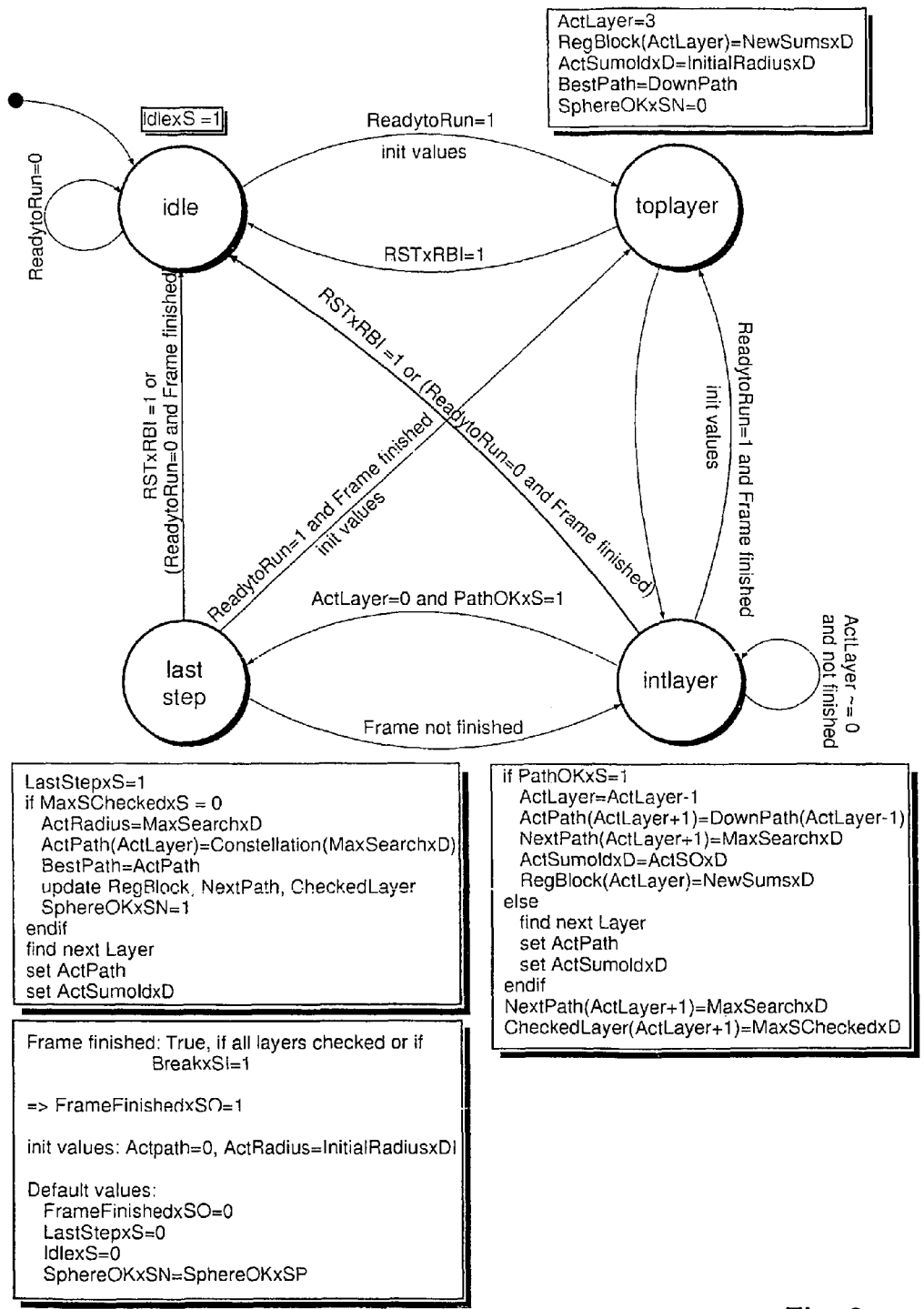
FIG. 9 illustrates the finite state machine of the calculation unit.

The procedure is visualized in FIG. 9.

7.2 Second Embodiment

Figure 10:
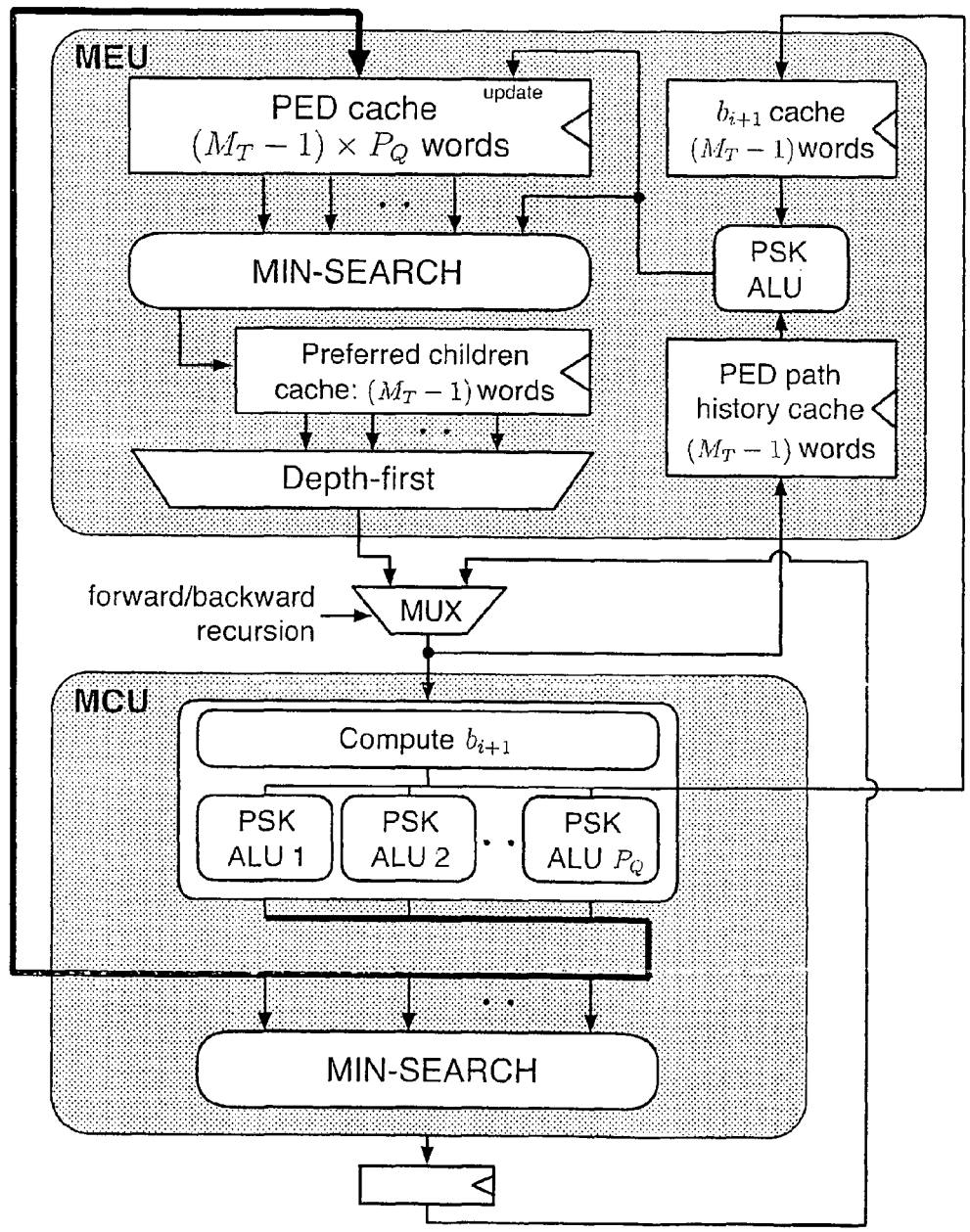
FIG. 10 is a block diagram of a SD ASIC with direct QAM enumeration according to a second embodiment of a decoder.

The second, particularity advantageous embodiment of a device for decoding a received signal in a multiple input/multiple output system also uses the general design of FIG. 1 with a more explicit (i.e., more obvious) separation of MEU and MCU, which carry out a depth-first tree traversal. It uses a decoding scheme as illustrated by FIG. 2. A more detailed block diagram of the circuit is shown in FIG. 10.

The second embodiment also adopts the one-node-per-cycle architecture. However, it computes $\hat{y}$ using $\hat{y}=Q^H y$ and employs the $l^\infty$-norm approximation as well as a scheme for direct SE enumeration (described below) in systems with QAM modulation.

A. Direct SE Enumeration for PSK-Like Constellations

In [11], Hochwald and ten Brink proposed a scheme that allows to compute boundaries of admissible intervals for complex-valued constellations having the constellation points arranged on concentric circles (e.g., PSK, 16-QAM). However, the original proposal requires the computation of trigonometric functions and other costly operations (cf. [1, Eq. (25)]). In the following, we propose a slight modification of the ideas in [11], which results in a low complexity VLSI implementation.

Figure 11:
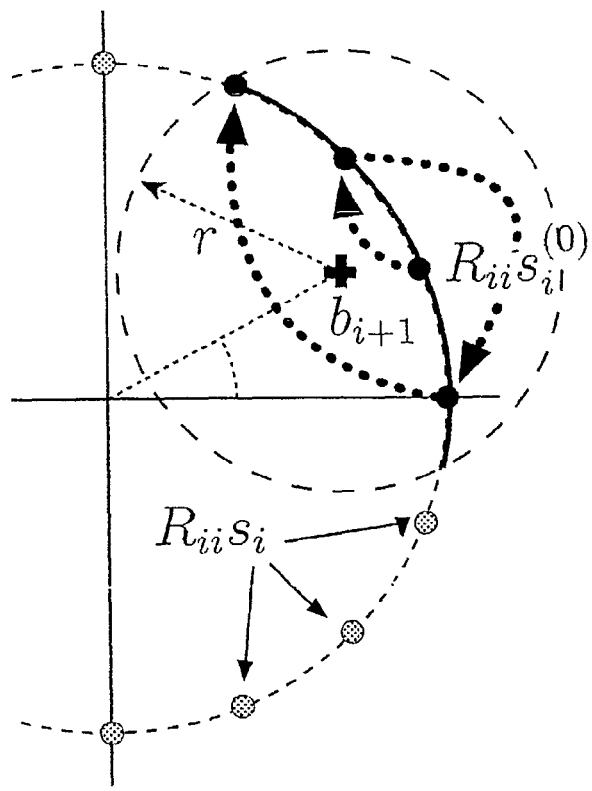
FIG. 11 illustrates the direct PSK enumeration scheme and FIG. 12 its application to 16-QAM without trigonometric functions (the inequalities represent the decision boundaries for determining the starting point and the initial direction of the enumeration, the illustration assumes $R_{ii}=1$ for simplicity)

1) Direct Enumeration for PSK Modulation: We shall first describe the basic idea for PSK modulation. In general, the preferred child in the forward pass (i.e., the starting point for the SE enumeration) is given by the constellation point minimizing the PD increment $\|b_{i+1}-R_{ii}s_i\|$. As all constellation points lie on a circle, around the origin and $R_{ii}$ can be chosen to be positive real without loss of generality, one can show that the preferred child can also be obtained from $$s_i^{(0)} = \underset{s_i \in O}{\operatorname{argmin}} |\operatorname{arc}(b_{i+1}) - \operatorname{arc}(s_i)|, \quad (26)$$

where arc( . . . ) denotes the phase of a complex number. Hence, the starting point $s_i(0)$ can be computed based on the phases of $b_{i+1}$ and $s_i$ only. SE enumeration for PSK modulation now amounts to proceeding from $s_i(0)$ in a zig-zag fashion along the unit circle. The procedure is illustrated in FIG. 11 for 16-PSK modulation. The direction of the initial step can be found considering the phase of $b_{i+1}$ and the two neighbors of $s_i(0)$. Once the PD of a constellation point violates the SC, the admissible interval is exceeded and enumeration terminates. If already the PD of the closest constellation point exceeds $r=\hat{C}$, the admissible interval is empty and a dead end is declared.

2) Direct Enumeration for QAM Modulation: A hybrid approach, as described above, between an exhaustive search and direct PSK enumeration allows to extend the proposed scheme to QAM modulation. We start by grouping the constellation points into subsets $C^k$ (with $k=1 \ldots P_Q$), according to the distance of their complex coordinate $s_i$ from the origin of the complex plane. For QPSK, 16-QAM, and 64-QAM, $P_Q=1$, 3, and 9 subsets, respectively, must be formed.

Each subset $C^k$ has m(k) members with coordinates $s_i = s^{k,1}, \ldots, s^{k,m(k)-1}$, or $s^{k,m(k)}$, all of which have a common absolute value $V^k=|R_{ii}s^{k,1}|=|R_{ii}s^{k,m(k)}|$. In other words, the members of a subset lie on a common circle around the origin of the complex plane.

The following direct QAM enumeration procedure can be used to construct a list of constellation points in SE ordering.

Step 1) Within each subset, the preferred child (i.e. a potential next child node) is determined based on a minimization of $|\operatorname{arc}(b_{i+1})-\operatorname{arc}(s_i)|$, and subsequently the corresponding PD is computed for each potential next child node.

Step 2) The PDs of the preferred children are compared, and the point with the smallest PD across the subsets is chosen by the MIN-SEARCH unit of the MCU.

Step 3) Before the next point in the SE ordering can be obtained in the MEU, the constellation point selected in step 2) is replaced by the next candidate in the corresponding subset $C^k$ according to the direct PSK enumeration, and the corresponding PD is computed. The algorithm proceeds with step 2) until all subsets are empty.

We note that the initialization step 1) requires the computation of $P_Q$ PDs. In the subsequent iterations, only a single PD per pass has to be computed.

The three steps above are carried out by the MCU and MEU in FIG. 10 as follows:

The PD $T_i$ of the preferred child in each subset is calculated in parallel for the different subsets, by PSQ ALU 1 . . . ALU $P_Q$ of the MCU, which use the commonly calculated value of $b_i$, which can also be calculated by the MCU.

The comparison of the PDs of the preferred children and the selection of the next child node having the smallest partial distance $T_i$ is carried out by the MIN-SEARCH unit of the MCU.

The PDs calculated by the MCU are fed to the MEU for storage. For each traversed level of the tree, the MEU stores the two PDs of the preferred nodes that were not selected by the MCU. For the subgroup $C^k$ that contains the selected node, the next candidate is selected by the MEU according to the direct PSK enumeration, and its PD is computed by the PSK ALU of the MEU. The operations of the MEU and MCU are carried out concurrently. While the MCU determines a next child node in level i, the MEU determines, in level i+1, a next node other than the selected child node to be used in the set $C^k$ of the selected child node.

To simplify the operation of the PSK ALU, the MEU contains a $b_{i+1}$ cache that stores the values $b_{i+1}$ for the most recently traversed node on all tree levels.

The PD of the next candidate is stored in the PED cache of the MEU. Hence, for each traversed level, the PED cache holds $P_Q$ candidates for nodes. A preferred one of these nodes is calculated by the MIN-SEARCH unit of the MEU and stored in a cache (Preferred children cache), that holds a preferred node for each traversed level. When the tree traversal has to switch back to an upper level, a Depth-First unit of the MEU selects the bottom most node in the Preferred children cache and forwards it to the multiplexer MUX for feeding to the MCU.

B. MCU Sphere ALU Implementation

PSK Enumeration: Recalling that the task of the MCU is to find the starting point of the enumeration, we can conclude that the MCU implements steps 1) and 2) of the first pass in the above described enumeration procedure. The MCU employs $P_Q$ PSK ALUs. Each of them solves (26) for one PSK subset $C^k$ to find the closest constellation point and the initial enumeration direction, which can both be identified through the introduction of suitable decision boundaries instead of using trigonometric functions. There is a first type of decision boundaries $B^{k,j}$ and a second type of decision boundaries $Q^{k,j}$, both of which can be determined prior to the traversal of the tree. An example of these boundaries for 16-QAM modulation is shown in FIG. 12.

Figure 12:
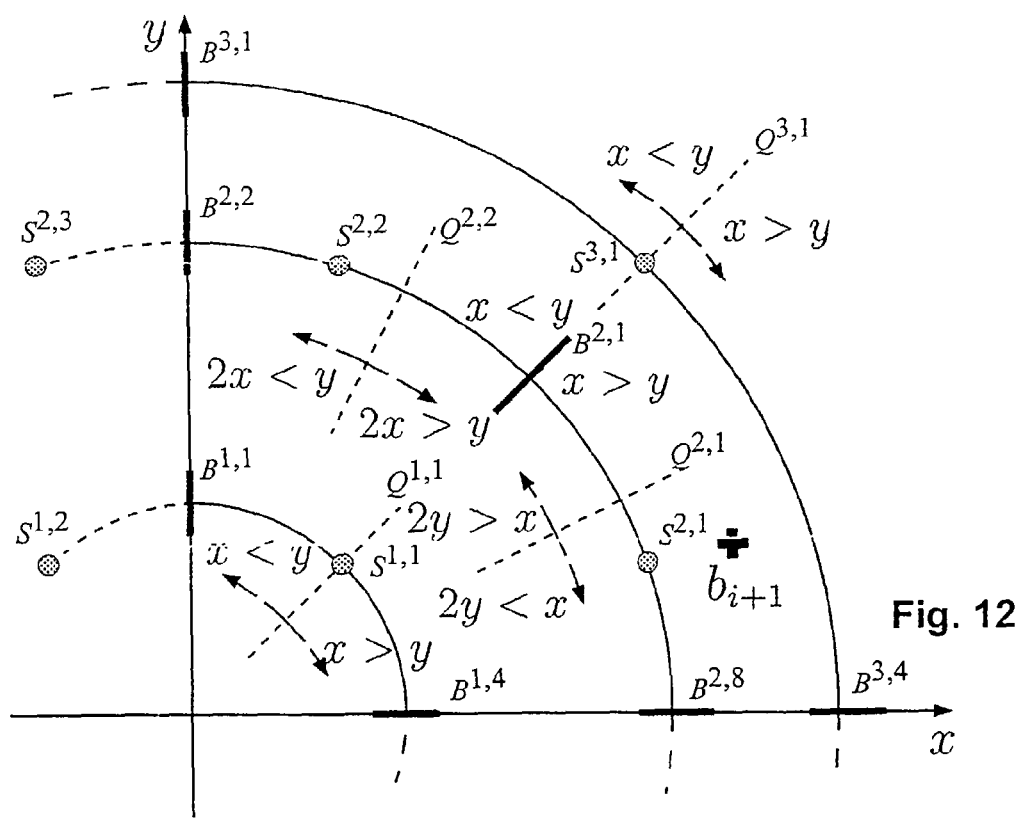

Each first boundary $B^{k,j}$, shown as fat lines in FIG. 12, is attributed to one member $s^{k,j}$ of set $C^k$ and is defined by the line of all complex numbers of equal distance from $R_{ii} s^{k,j}$ and $R_{ii} s^{k,j+1}$, where $s^{k,j+1}$ is the nearest neighbor (e.g. in counter-clockwise direction) of $s^{k,j}$, Each second boundary $Q^{k,j}$, shown as dashed lines in FIG. 12, is also attributed to one member $s^{k,j}$ of set $C^k$ and is given by the line of all complex numbers of equal distance from the two nearest neighbors $R_{ii} s^{k,j-1}$ and $R_{ii} s^{k,j+1}$.

These (first and second) boundaries can be recorded as the ratio between the real and imaginary-y parts of the numbers lying thereon. They can either be recorded by storage in suitable registers, or, in a VLSI implementation, they can be recorded by hardwiring them into the calculation units of the device. These ratios can, during the traversal, be used for comparison with the ratio of the real and imaginary parts of $b_{i+1}$. Even though the term ratio is used in this context, no division is required for storing the same. For example, the ratio for first boundary $B^{1,1}$ in the example of FIG. 12 is 1:1, which can be stored by storing the nominator n=1 and denominator d=1, while the ratio for $Q^{2,1}$ is 2:1, which can again be stored by storing the nominator n=1 and denominator d=2. For comparison, $Re(b_{i+1}) \cdot n$ can be compared to $Im(b_{i+1}) \cdot d$. Hence, a simple comparison of (suitably scaled) values of the real and imaginary parts of $b_{i+1}$ is sufficient to determine the position of $b_{i+1}$ in respect to the boundaries.

In other words, the boundaries can be specified in terms of relations between the real and imaginary parts of $b_{i+1}$, which can be checked efficiently with very little hardware effort.

The first decision boundaries $B^{k,j}$ are used for finding the closest point of set $C^k$: If $b_{i+1}$ lies in the area between $B^{k,j-1}$ and $B^{k,j}$, the closest point is $s^{k,j}$.

The second decision boundaries $Q^{k,j}$ determine the initial direction of the direct PSK enumeration in set $C^k$. If ski was determined to be the closest point to $b_{i+1}$ and $b_{i+1}$ lies between $Q^{k,j-1}$ and $Q^{k,j}$ the second closest point is $s_{k,j-1}$. If, however, $s^{k,j}$ was determined to be the closest point to $b_{i+1}$ but $b_{i+1}$ lies between $Q^{k,j}$ and $Q^{k,j+1}$, the second closest point is $s^{k,j+1}$.

An advantageous implementation also exploits the symmetry of the constellation to reduce the problem to the first quadrant, thus requiring the examination of the absolute values of the real and imaginary parts of $b_{i+1}$ only. This adjustment infers extra cost resulting from the need to map the solution in the first quadrant back into the actual quadrant. However, this extra cost is more than compensated for by the reduced number of decision boundaries.

Advantageously when using the scheme of FIG. 12, the triangular matrix R is calculated from the channel matrix H such that all diagonal elements $R_{ii}$ are real valued, which avoids a rotation of the complex plane upon multiplication with $R_{ii}$ and obviates the need to update the boundaries when the values of $R_{ii}$ change.

Metric Computation After the closest point in each subset has been determined, the associated PDs are computed. As opposed to ASIC-I, where $2^Q$ candidate symbols are considered in parallel, the equation $$|e_i(s^{(i)})|^2 = |b_{i+1}(s^{(i+1)}) - R_{ii} s_i|^2 \qquad (27)$$

needs to be evaluated for only $P_Q \ll 2^Q$ candidate symbols; therefore, it is not worthwhile to pursue resource sharing.

$l^\infty$-norm Approximation: The application of the $l^\infty$-norm approximation is straightforward, as it only changes the computation of the PDs in the PSK ALUs. However, as opposed to the exhaustive search architecture in ASIC-I, fewer (only $2P_Q$) instantiations of the $l^2$-norm approximation are needed and an overall area advantage is achieved by the $l^\infty$-norm approximation.

C. MCU MIN-SEARCH Implementation

The starting point of the enumeration is finally found as the minimum across the preferred children of the different PSK subsets. As opposed to the exhaustive search of the first implementation, the number of candidates to be compared in the MIN-SEARCH is significantly reduced. Fortunately, this also reduces the delay of the MIN-SEARCH and its contribution to the critical path so that, unlike in ASIC-I, there is no need to deviate from strict SE ordering.

We conclude by noting that the combination of phase-based direct PSK enumeration and the $l^\infty$-norms approximation results in a "hybrid" overall "norm" that is neither $l^2$ nor $l^\infty$. Correspondingly, the exact solution and search time will in general deviate (slightly) from a strict exhaustive search based $l^\infty$-norm implementation.

D. MEU Implementation

The MEU executes step 3) in the QAM enumeration procedure described above. For every subset, it keeps track of the preferred children of each node between the current node and the root of the tree. As opposed to the exhaustive search decoder, this only requires a PD cache with $P_Q$ entries per tree level, as opposed to $2^Q$ entries. However, every time a child has been visited by a forward or backward iteration, the corresponding entry in the cache needs to be updated. Consequently, the MEU contains an additional PSK ALU, which is, however, much simpler than the PSK ALUs in the MCU, as no decision boundaries need to be checked. The next constellation point is simply obtained by direct PSK enumeration [cf. FIG. 11]. Most of the complexity in evaluating (27) is in computing $b_{i+1}$. However, as this term has already been computed in the MCU, it is kept in a small cache in the MEU.

A PD path history cache is finally needed to store the PDs of the parent nodes along the current path from the root, which are needed by the PSK ALU in order to compute $$T_i(s^{(i)}) = T_{i+1}(s^{(i+1)}) + |e_i(s^{(i)})|^2. \qquad (28)$$

When all the children in the admissible interval of a PSK subset have been visited, the corresponding entry in the PD cache is marked as invalid. Exactly like in the first embodiment, a MIN-SEARCH constantly determines the preferred child across subsets and places it into the preferred children cache, from which the next node is chosen by the depth-first multiplexer in the case of a leaf or a dead end.

F. Discussion

The implementation described in this section requires the parallel computation of a much smaller number of PDs (compared to the first embodiment) and hence benefits significantly from the $l^\infty$-norm approximation, as resource sharing in the squared-norm case is less efficient. The length of the overall critical path is reduced by roughly 25% compared to the same architecture, based on the squared $l^2$-norm. Also, a significant reduction in the average number of visited nodes obtained through the use of the $l^\infty$-norm contributes significantly to the high throughput of the chip. The corresponding performance loss (due to the use of a suboptimal "norm") is a 1.4 dB SNR degradation. The complexity of the MCU and the memory (cache) requirements in the MEU scale only with $P_Q$. Since $P_Q \ll 2^Q$ for higher order modulation, the architecture is particularly well suited for large constellations.

General Comments

In the examples above, the vectors y and s were assumed to be complex in most cases. They can also be real-valued. Similarly, the matrix H (and the matrices Q and R) are generally assumed to be complex but they can also be real valued.

The constellation O will, in many applications, contain $2^{Mc}=A$ signal points with Mc being the order of the used modulation scheme but, as it is known to the person skilled in the art, it is not limited to having a power of 2 entries.

As mentioned, the invention can be used in a radio communication system having M transmit antennas and N receive antennas, employing for example spatial multiplexing. However, as it is clear to the person skilled in the art, it is applicable to any type of communication channel the characteristics of which can be expressed by (1). Other particular examples are other space-time codes or multi-user detection in CDMA.

Even though the above discussion was primarily focused on a VLSI implementation of the invention, the same techniques can also be applied to an implementation in a DSP or in pure software.

While there are shown and described presently preferred embodiments of the invention, it is to be distinctly understood that the invention is not limited thereto but may be otherwise variously embodied and practiced within the scope of the following claims.

REFERENCES

[1] M. Pohst, "On the computation of lattice vectors of minimal length, successive minima and reduced bases with applications," ACM SIG-SAM, pp. 37-44, 1981

[2] E. Viterbo and J. Boutros, "A universal lattice code decoder for fading channels," IEEE Trans. Info. Theory, vol. 45, pp. 1639-1642, July 1999.

[3] M. O. Damen, H. El Gamal, G. Caire, "On Maximum-Likelihood Detection and the Search for the Closest Lattice Point" IEEE Trans. Info. Theory, vol. 49, no. 10, pp. 2389-2402

[4] M. O. Damen, A. Chkeif, and J.-C. Belfiore, "Lattice code decoder for space-time codes", IEEE Comm. Let., pp. 161-163, May 2000

[5] Albert M. Chan, Inkyu Lee, "A New Reduced-Complexity Sphere Decoder For Multiple Antenna Systems", Proceedings of IEEE International Communication Conference, ICC, April 2002

[6] B. Hassibi and H. Vikalo, "On the expected complexity of sphere decoding", Proc. Asilomar Conf. on Signals, Systems and Computers, 1051-1055, Pacific Grove, Calif., 2001

[7] B. Hassibi and H. Vikalo: "On the expected complexity of sphere decoding", Proc. IEEE-ICASSP 2002, Vol. 2, pp. 1497-1500

[8] U. Fincke and M. Pohst. Improved methods for calculating vectors of short length in a lattice, including a complexity analysis. Mathematics of Computation, 463-471, April 1985

[9] G. J. Foschini, "Layered space-time architecture for wireless communication in a fading environment when using multi-element antennas," Bell Labs. Tech. Journal, vol. 1, no. 2, pp. 41-59, 1996.

[10] C. P. Schnorr and M. Euchner: "Lattice basis reduction: Improved practical algorithms and solving subset sum problems", Math. Programming, 1994, Vol. 66, pp. 181-191

[11] B. M. Hochwald, S. ten Brink: "Achieving Near-Capacity on a Multiple-Antenna-Channel," IEEE Trans. Inform. Theory, vol. 51, no. 3, pp. 389-399, March 2003

The invention claimed is:

1. A method for decoding a received signal in a multiple input/multiple output system having transmission characteristics approximated by the equation $$y=Hs+n,$$

wherein y is an N×1 vector describing a received signal,

H is a channel matrix, wherein H=QR with an M×M triangular matrix R and an N×M unitary matrix Q, s is a transmitted M×1 signal vector whose coordinate values are chosen from a constellation O containing A possible coordinate values, n is an N×1 vector of zero-mean noise entries, M is a number of transmitter sources, and N is a number of receiver sinks, said method comprising the step of finding an entry ŝ in O for which $$\hat{s} = \arg\min_{s \in O} \|Rs - \hat{y}\|$$

with $\|\ \|$ being a norm other than the Euclidean $l^2$-norm and $\hat{y}=Q^H y$, and with $Q^H$ being the conjugate transpose of Q, wherein y is a complex vector, H is a complex matrix, O is a complex constellation with $2^{Mc}=A$ possible signal points with Mc being an order of a used modulation scheme, and n is a complex vector.

2. The method of claim 1 wherein the system is a radio communication system having M transmit antennas and N receive antennas.

3. The method of claim 1 wherein $\|\ \|$ denotes the l∞-norm with $$\|(x_1, x_2, \ldots, x_M)\| = \max_i (|x_i|).$$

4. The method of claim 1 wherein $\|\ \|$ denotes the $l^1$-norm with $$\|(x_1, x_2, \ldots, x_M)\| = \sum_i |x_i|.$$

5. The method of claim 1 wherein the step of finding said entry ŝ comprises at least one step of finding an s with entries selected from O with $$\|Rs - \hat{y}\| < \hat{C}$$

for a positive number $\hat{C}$.

6. The method of claim 5 comprising repeated search steps of finding an s with entries selected from O with $$\|Rs - \hat{y}\| < \hat{C}$$

for decreasing values of $\hat{C}$.

7. The method of claim 6 wherein $\|\ \|$ denotes the $l^\infty$-norm with $$\|(x_1, x_2, \ldots, x_M)\| = \max_i (|x_i|)$$

and wherein each search step comprises a recursive computation of a partial distance $T_i$ from a partial distance $T_{i+1}$ from $$T_i(s) = \max\left(T_{i+1}(s), \left|\hat{y}_i - \sum_{j=i}^{M} R_{ij} s_j\right|\right).$$

8. The method of claim 6 wherein $\|\ \|$ denotes the $l^1$-norm with $$\|(x_1, x_2, \ldots, s_M)\| = \sum_i |x_i|$$

and wherein each search step comprises a recursive computation of a partial distance $T_i$ from a partial distance $T_{i+1}$ from $$T_i(s) = |T_{i+1}(s)| + \left|\hat{y}_i - \sum_{j=i}^{M} R_{ij} s_j\right|.$$

9. The method of claim 1 wherein $\hat{C}$ is reduced until a single s with entries selected from O fulfils $\|Rs-\hat{y}\|<\hat{C}$.

10. The method of claim 1, further comprising the step of calculating said triangular matrix R from said channel matrix H such that all diagonal elements $R_{ii}$ of said triangular matrix R are real.

11. A decoding a received signal from a multiple input/multiple output system, wherein said multiple input/multiple output system has transmission characteristics approximated by the equation $$y = Hs + n,$$

wherein y is an N×1 vector describing a received signal,

H is a channel matrix, wherein H=QR with an M×M upper triangular matrix R and an N×M unitary matrix Q, $s=(s_1, \ldots, s_M)$ is a transmitted M×1 signal vector whose coordinate values are chosen from a constellation O containing A possible coordinate values, n is an N×1 vector of zero-mean noise entries, M is a number of transmitter sources, and N is a number of receiver sinks, said method comprising at least one traversal of a tree having leaves representing possible vectors s and nodes in levels $i=1 \ldots M$ representing the selection of coordinates $s_i \ldots s_M$ from a set of possible coordinates, said at least one transversal being used for finding an ŝ for which $$\|Rs-\hat{y}\|<\hat{C}$$

with $\|\ \|$ denoting a norm, $\hat{C}$ a positive number, and $\hat{y} = (\hat{y}_1, \ldots, \hat{y}_M) = Q^H y$, and with $Q^H$ being being the conjugate transpose of Q, each tree traversal comprising the recursive calculation of a partial distance $T_i$ from a partial distance $T_{i+i}$ along a path, wherein the partial distances $T_i$ are defined by $$T_i = \|e^{(i)}\|$$

with $e^{(i)} = (0, \ldots, e_i, \ldots e_M)$
and $e = (e_1, \ldots e_M) = Rs - \hat{y}$, said tree traversal comprising the repeated execution of the following two steps while descending along said path through the levels i of said tree step a) operating a first computing means (MCU) for selecting a child node in level i from a parent node in level i+1, and, step b) operating a second computing means (MEU) for determining a next node in level j>i other than a previously selected child node, which next node in level j is to be used' in case that a later traversal has to start at level j.

12. The method of claim 11 wherein said steps a) and b) are executed concurrently.

13. The method of claim 11 wherein j=i+1.

14. The method of claim 11 wherein, in said step a), the partial distance $T_i$ for the next child node is calculated from the partial distance $T_{i+1}$ of the parent node, and wherein, in said step b) the partial distance $T_j$ of the next node of level j is calculated.

15. The method of claim 14 wherein said partial distance $T_j$ of the next parent node of level j is stored in said second computing means.

16. The method of claim 14 wherein the calculation of the partial distance $T_i$ of the child node from the partial distance $T_{i+1}$ of the parent node requires the evaluation of the term $$e_i = \hat{y}_i - \sum_{j=i}^{M} R_{ij} s_j$$

which is computed by evaluating $$e_i = b_{i+1} - R_{ii} s_i \text{ with } b_{i+1} = \hat{y}_i - \sum_{j=i+1}^{M} R_{ij} s_j,$$

wherein $b_{i+1}$ is stored for subsequent calculation of $e_i$.

17. The method of claim 16 comprising the step of storing $b_{i+1}$ in said second computing means.

18. The method of claim 17 comprising the step of storing $b_{i+1}$ in said second computing means for each node of a current traversal of said tree.

19. The method of claim 11, wherein, in said step b), said second computing means is operated to determine the next child node having the smallest partial distance $T_j$.

20. The method of claim 11, wherein, for each level i, the nodes are divided into sets $C^k$, wherein, in said step a) said first computing means is operated to select one potential next child node from at least two different sets $C^k$, in particular from all different sets $C^k$, calculate the partial distances $T_i$ of each potential next child node, and select the next child node as the node of the potential next child nodes having the lowest partial distance $T_i$.

21. The method of claim 20 wherein said second computing means stores the potential next child nodes other than the next child node and, while said first computing means determines a next child node in level i, said second computing means determines, in level j, a next node other than a previously selected child node to be used in the set $C^k$ of the selected child node.

22. The method of claim 20 wherein said signal vectors s are complex vectors and wherein, for a given level i, each subgroup comprises the coordinates $s_i$ in said constellation O that have a common absolute value $|s_i|$ of their coordinate $s_i$.

23. A method for decoding a received signal from a multiple input/multiple output system, wherein said multiple input/multiple output system has transmission characteristics approximated by the equation $$y=Hs+n,$$

wherein
y is an N×1 vector describing a received signal,
H is a channel matrix, wherein H=QR with an M×M upper triangular matrix R and an N×M unitary matrix Q,
$s=(s_1, \ldots, s_M)$ is a transmitted M×1 signal vector whose coordinate values are chosen from a constellation O,
n is an N×1 vector of zero-mean noise entries,
M is a number of transmitter sources, and
N is a number of receiver sinks,
said method comprising at least one traversal of a tree having leaves representing possible vectors s and nodes in levels i=1 ... M representing the selection of coordinates $s_i \ldots s_M$ from a set of possible coordinates,
wherein each tree traversal comprises repeated steps of selecting a next node in level i given a node in level i+1 by finding the coordinate $s_i$ with a value $R_{ii}s_i$ that is closest to a complex value $b_{i+1}$ $$b_{i+1} = \hat{y}_i - \sum_{j=i+1}^{M} R_{ij}s_j,$$

with $\hat{y}=(\hat{y}_1, \ldots, \hat{y}_M)=Q^H y$,
wherein the possible coordinates $s_i$ are divided into sets $C^k$, each set $C^k$ having m(k) members with coordinates $s_i=s^{k,1}, \ldots s^{k,m(k)-1}$, or $s^{k,m(k)}$, all of which have a common absolute value $V^k=|R_{ii}s^{k,1}|=\ldots=|R_{ii}s^{k,m(k)}|$,
wherein, in at least some of said repeated steps the coordinate $s_i$ in level i is selected by
step i) prior to said traversal, determining, for at least some of the pairs of neighboring members $s^{k,j}, s^{k,j+1}$ of each set $C^k$, a first boundary $B^{kj}$ given by a line of all numbers of equal distance from $R_{ii}s^{k,j}$ and $R_{ii}s^{k,j+1}$, and
step ii) during said traversal, selecting the coordinate $s_i$ by comparing, for at least one of said sets $C^k$, said value $b_{i+1}$ to said first boundaries $B^{kj}$, thereby determining the member $s^{kj}$ of set $C^k$ having a value $R_{ii}s^{kj}$ is closest to the value $b_{i+1}$.

24. The method of claim 23 wherein, in step i) each first boundary $B^{kj}$ is defined by recording a ratio between real and imaginary parts of the numbers lying on said first boundary and storing the ratios of said first boundaries for access during said traversal, and wherein, in step ii) a ratio of the real and imaginary parts of $b_{i+1}$ is compared to the recorded ratios.

25. The method of claim 24 comprising the steps of determining, prior to said traversal, for at least some of the members $s^{kj}$ of each subset $C^k$, second boundaries $Q^{kj}$ given by a line of all numbers of equal distance from the two nearest neighbors $R_{ii}s^{kj-1}$ and $R_{ii}s^{kj+1}$ and during said traversal, if a level i is being passed a second or further time, selecting a hopping direction to a next best coordinate $s_i$ from a comparison of said value $b_{i+1}$ to said second boundaries.

26. The method of claim 23 comprising the steps
of determining, prior to said traversal, for at least some of the members $s^{kj}$ of each subset $C^k$, second boundaries $Q^{kj}$ given by a line of all numbers of equal distance from the two nearest neighbors $R_{ii}s^{kj-1}$ and $R_{ii}s^{kj+1}$ and
during said traversal, if a level i is being passed a second or further time, selecting a hopping direction to a next best coordinate $s_i$ from a comparison of said value $b_{i+1}$ to said second boundaries.

27. The method of claim 26 wherein each second boundary $B^{kj}$ is defined by storing a ratio between real and imaginary part of the numbers lying on said first boundary and wherein the ratios of said second boundaries are recorded for being used during said traversal.

28. A device for decoding a received signal in a multiple input/multiple output system, which multiple input/multiple output system has transmission characteristics approximated by the equation $$y=Hs+n,$$

wherein
y is an N×1 vector describing a received signal,
H is a channel matrix, wherein H=OR with an M×M triangular matrix R and an N×M unitary matrix O,
s is a transmitted M×1 signal vector whose coordinate values are chosen from a constellation
O containing A possible coordinate values,
n is an N×1 vector of zero-mean noise entries,
M is a number of transmitter sources, and
N is a number of receiver sinks,
said device finding an entry $\hat{s}$ in O for which $$\hat{s} = \arg\min_{s \in O} \|Rs - \hat{y}\|$$

with $\|\;\|$ being a norm other than the Euclidean $l^2$-norm and $\hat{y}=Q^H y$, and with $O^H$ being the conjugate transpose of O,
wherein
y is a complex vector, H is a complex matrix, O is a complex constellation with $2^{Mc}=A$ possible signal points with Mc being an order of a used modulation scheme, and n is a complex vector.

* * * * *